US008318370B2

(12) United States Patent
Keogh

(10) Patent No.: US 8,318,370 B2
(45) Date of Patent: Nov. 27, 2012

(54) PERIODIC FLOW HEAT EXCHANGER

(76) Inventor: Rory C. Keogh, San Francisco, CA (US)

( * ) Notice: Subject to any disclaimer, the term of this patent is extended or adjusted under 35 U.S.C. 154(b) by 387 days.

(21) Appl. No.: 12/752,076

(22) Filed: Mar. 31, 2010

(65) Prior Publication Data

US 2010/0263853 A1    Oct. 21, 2010

Related U.S. Application Data

(60) Provisional application No. 61/165,027, filed on Mar. 31, 2009.

(51) Int. Cl.
H01M 8/04 (2006.01)
F28D 17/00 (2006.01)
(52) U.S. Cl. .......................................... 429/439; 165/10
(58) Field of Classification Search .................. 429/419, 429/433, 434, 436, 439, 440; 165/4, 7, 10; 137/309, 625, 43
See application file for complete search history.

(56) References Cited

U.S. PATENT DOCUMENTS

| 3,770,050 | A | * | 11/1973 | Nakanishi | 165/97 |
| 4,966,228 | A | * | 10/1990 | Fawcett | 96/126 |
| 5,695,002 | A | * | 12/1997 | Tanaka et al. | 165/10 |
| 7,766,025 | B2 | * | 8/2010 | Greco | 137/1 |

* cited by examiner

Primary Examiner — Ula C. Ruddock
Assistant Examiner — Thomas H. Parsons
(74) Attorney, Agent, or Firm — Fenwick & West LLP

(57) ABSTRACT

A heat exchanger includes a first regenerator core and a second regenerator core and a four-way valve coupled to a cold section of the first regenerator core and to a cold section of the second regenerator core. The four-way valve directs input air to the first regenerator core or to the second regenerator core. A high-temperature passive check valve is coupled to a hot section of the first regenerator core and to a hot section of the second regenerator core. The high-temperature passive check valve comprises an inlet header coupled to the hot section of the first regenerator core or the second regenerator core, a valve poppet coupled to a valve stem and a valve seat located on a surface parallel to a surface of the valve poppet. Air entering the inlet header moves the valve poppet away from the valve seat, creating an opening through which air passes.

9 Claims, 10 Drawing Sheets

PERIODIC FLOW HEAT EXCHANGER

CROSS REFERENCE TO RELATED APPLICATIONS

This application claims the benefit of U.S. Provisional Application No. 61/165,027, filed Mar. 31, 2009, which is incorporated by reference in its entirety.

BACKGROUND

This invention generally relates to gas-to-gas heat exchangers, and more particularly to modifying airflow through regenerator cores of a gas-to-gas heat exchanger.

Heat exchangers can significantly improve the efficiency of many energy conversion devices by capturing waste heat from the exhaust stream of an energy conversion process and transferring the captured heat into the input stream of the energy conversion process. Capturing and using waste heat from the conversion process exhaust stream reduces the amount of energy used by the energy conversion device, which improves energy conversion device efficiency. For example, heat exchangers may improve the efficiency of gas turbine engines, fuel cells, regenerative thermal oxidizers or other combustion devices. As another example, a heat exchanger recovers waste heat from a gas turbine engine exhaust, reducing the amount of fuel used to achieve a given combustor exit temperature and improving the thermal efficiency of the gas turbine engine.

Conventional heat exchanger designs use stationary counter-flow fin-and-plate recuperators or rotating ceramic matrix regenerator heat exchangers. Stationary counter-flow heat exchangers pass heated turbine exhaust through a series of plates separating the heated exhaust flow from the relatively cool compressor exit flow. The waste heat from the turbine exhaust is transferred from the high temperature exhaust stream to the cooler compressor exit flow. Typically, each plate includes fins to increase the heat exchanger effectiveness while reducing its size. However, the high-temperature materials needed for the stationary counter-flow recuperator and its relatively complex geometry limits its performance and adds significant cost to an energy conversion device. For example, in a microturbine gas turbine system, a recuperator has the largest cost component, often up to 30%, at is also physically large and complex to design and manufacture. The use of hundreds of small channels, generally from 1 to 5 millimeters, to provide sufficient flow area for heat transfer from hot flow to cold flow at minimal pressure drop causes much of this design complexity. Additionally, the channels are sealed and must be capable of sustaining a pressure and temperature difference between hot and cold sides. Hence, various parts and operations are used for recuperator construction, resulting in high costs that are difficult to significantly reduce, even with higher production volumes.

Rotating ceramic matrix heat exchangers include materials enabling high cycle temperatures and enabling high heat exchange effectiveness. However, leakage between a hot flow and a cold flow can cause significant loss, as 4% to 14% of the flow from the compressor may leak into a turbine, or other energy conversion device, exhaust. Additionally, a more complex system or gears and seals are needed to enable heat exchanger rotation. One type of rotating ceramic heat exchanger uses indexed rotation to disengage a movable seal from the face of the regenerator and move a rotor through a partial revolution before reengaging the seal. While this disengagement may reduce leakage by reducing seal wear, the components of such a heat exchanger are specialized, increasing heat exchanger cost.

SUMMARY

Embodiments of the invention provide a periodic-flow heat exchanger including a first regenerator core having a first flow in a first direction and a second regenerator core having a second flow in a second direction. In one embodiment, the first direction is opposite to the second direction. Periodically, the direction of the first flow and the direction of the second flow are reversed. For example, the first flow in the first regenerator core has the second direction and the second flow in the second regenerator core has the first direction when the directions are reversed.

In one embodiment, a heat exchanger includes an inlet port and a four-way valve which receive incoming air. The four-way valve periodically alternates the direction of the flow entering and exiting the first regenerator core and the second regenerator core. The first regenerator core receives flow from the four-way valve and as the flow passes through the first regenerator core, the flow absorbs heat from the first regenerator core. A first high-temperature check valve is coupled to the first regenerator core and the heated flow exits the first regenerator core through the high-temperature check valve. A second high-temperature check valve is coupled to the first high-temperature check valve and to the second regenerator core. The heated flow travels from the first high-temperature check valve to the second high-temperature check valve where it flows into the second regenerator core. As the heated flow travels through the second regenerator core, heat from the heated flow is absorbed and stored by the second regenerator core. After heat from the flow is absorbed by the second regenerator core, the flow travels through the four-way valve into an exhaust port coupled to the four-way valve.

In one embodiment, the first regenerator core and the second regenerator core comprise ceramic regenerator cores. Additionally, the four-way valve periodically changes the flow direction so that during a first time interval the incoming process flow enters the first regenerator core and exits to the exhaust port from the second regenerator core and during a second time interval the incoming process flow enters the second regenerator core and exits to the exhaust port through the first regenerator core. In certain embodiments, the first and second high-temperature check valves are omitted and the heat exchanger comprises a four-way valve and the first regenerator core and the second regenerator core.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Regenerator System Configuration

Figure 1:
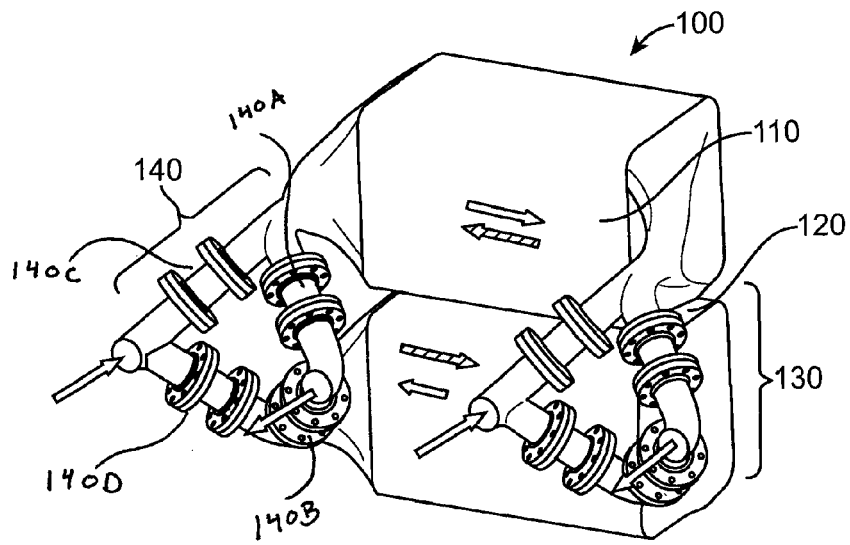
FIG. 1 is an isometric view of a regenerator system in accordance with one embodiment.

FIG. 1 shows one embodiment of a regenerator system 100 comprising a first regenerator core 110 and a second regenerator core 120. A four-way valve 130 is coupled to a first side of the first regenerator core 110 and to a first side of the second regenerator core 120. The four-way valve 130 receives and directs input air and into the first regenerator core 110 or into the second regenerator core 120. In one embodiment, the four-way valve 130 periodically redirects the input air into the first regenerator core 110 or into the second regenerator core 120. For example, during a first time interval, the four-way valve 130 directs input air into the first regenerator core 110 and during a second time interval, the four-way valve 130 directs input air into the second regenerator core 120.

A high-temperature check valve assembly 140 is coupled to a second side of the first regenerator core 110 and to a second side of the second regenerator core 120. In one embodiment, the high-temperature check valve assembly 140 comprises a plurality of check valves. For example, as shown in FIG. 1, a first high-temperature check valve 140A is coupled to the first regenerator core 110 and heated air exits the first regenerator core 110 through the first high-temperature check valve 140A to an inlet port. In one embodiment, the inlet port directs the heated air to an energy conversion process, or an energy conversion device. A second high-temperature check valve 140B is coupled to the inlet port and to the second regenerator core 120. A third high-temperature check valve 140C is coupled to an exhaust port and to the first regenerator core 110 while a fourth high-temperature check valve is coupled to the exhaust port and to the second regenerator core. Hence, the first high-temperature check valve 140A and the second high-temperature check valve 140B allow heated air to flow from the first regenerator core 110 or from the second regenerator core 120 to the exhaust port. The third-high temperature check valve 140C and the fourth high-temperature check valve 140B allow air, such as exhaust from an energy conversion process, to travel through the first regenerator core 110 or through the second regenerator core 120.

During operation, air flowing through the first side of the first regenerator core 110 and the first side of the second regenerator core 120 has a relative temperature lower than that of air flowing through the second side of the first regenerator core 110 and the second side of the second regenerator core 120. Because of this relative temperature difference, the four-way valve 130 is coupled to a "cold" side of the first regenerator core 110 and a "cold" side of the second regenerator core. Because of the increased temperature of the air flowing through the second side of the first regenerator core 110 and the second side of the second regenerator core 120 during operation, the high-temperature check valve 140 is coupled to a "hot" side of the first regenerator core 110 and to a "hot" side of the second regenerator core 120.

Figures 2A, 2B:
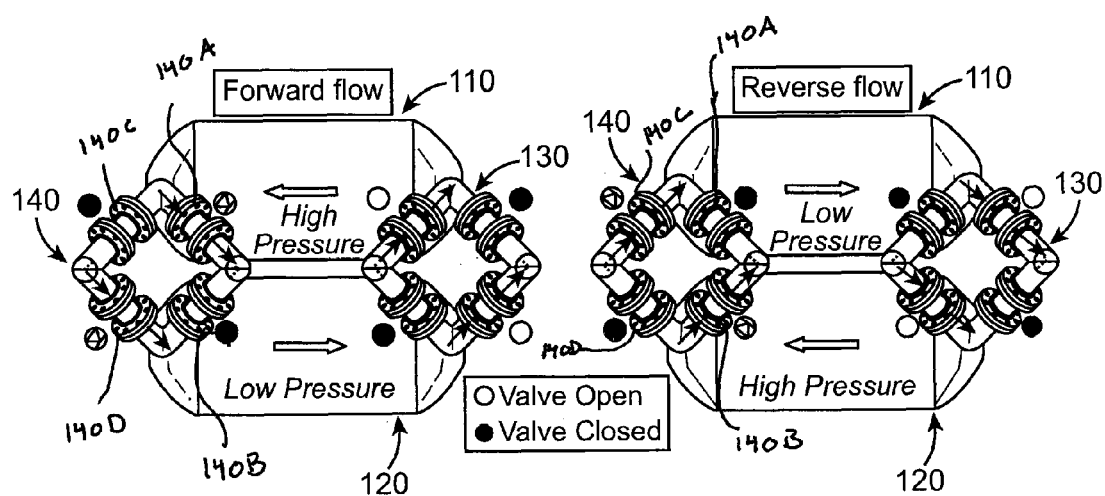
FIG. 2A is an example of a regenerative heat exchanger in a forward flow mode in accordance with one embodiment.
FIG. 2B is an example of a regenerative heat exchanger in a reverse flow mode in accordance with one embodiment.

FIG. 2A is an example of a regenerative heat exchanger in a forward flow mode and FIG. 2B is an example of a regenerative heat exchanger in a reverse flow mode. As shown in FIGS. 2A and 2B, the four-way valve 130 receives incoming cold process flow air and directs the incoming cold air into either the first regenerator core 110 or the second regenerator core 120. Additionally, the four-way valve 130 receives heated exhaust process flow air from either the first regenerator core 110 or the second regenerator core 120 and directs the heated air into an exhaust port. For example, the four-way valve 130 directs the incoming process flow air to the first regenerator core 110 and receives heated exhaust process flow air from the second regenerator core 120. Periodically, the four-way valve 130 switches the flow direction so that the incoming process flow air is directed to the second regenerator core 120 and heated exhaust process flow air is received from the first regenerator core 130.

For example, in a "forward flow configuration" during a first time interval inlet process flow air is received by the four-way valve 130 which channels the inlet process flow air into the first regenerator core 110 where the inlet process flow air absorbs waste heat from the first regenerator core 110. In one embodiment, the inlet process flow air absorbs waste heat from a ceramic matrix in the first regenerator core 110. After the inlet process flow air absorbs heat, the heated air flows through a high-temperature check valve assembly 140 and into an energy conversion or combustion process. For example, during the first time interval, shown in FIG. 2A a first-high temperature check valve 140A coupled to a hot side of the first regenerator core 110 directs air heated by the first regenerator core to a process inlet port which directs the heated air to an energy conversion process or to an energy conversion device. A second high-temperature check valve 140B is coupled to the process inlet port and to a hot side of the second regenerator core 130 and blocks air from the process inlet port from flowing into the second regenerator core 130 during the first time interval. A third high-temperature check valve 140C is coupled to a process exhaust port and to the hot section of the first regenerator core 110. During the first time interval, the third high-temperature check valve 140C blocks air from the process exhaust port from entering the first regenerator core 110. A fourth high-temperature check valve 140D is coupled to the process exhaust port and to the second regenerator core 130 and directs air from the exhaust port into the second regenerator core 130. In one embodiment, the second regenerator core absorbs heat from the air from the third high-temperature check valve 140C to cool the received air. For example, as the high-temperature process exhaust flows through the second regenerator core 120, heat from the high-temperature process exhaust is absorbed by the second regenerator core 120 and the cooled process exhaust is exhausted through the four-way valve 130 to an exhaust port. In one embodiment, a ceramic core included in the second regenerator core 120 absorbs heat from the high-temperature process exhaust.

In one embodiment, the four-way valve 130 periodically switches the direction of the incoming flow so that the incoming flow travels from the four-way valve 130 into the second regenerator core 120 during a second time interval. For example, the four-way valve 130 switches incoming air flow between the first regenerator core 110 and the second regenerator core 120 at 30 second or 60 second intervals. In the second time interval, the second regenerator core 120 heats the incoming air flow, and the heated air is directed from the second regenerator core 120 to the process inlet port by the second high-temperature check valve 140B while the first high-temperature check valve 140A blocks air form the process inlet port from entering the first regenerator core 110. Air received by the process exhaust port is directed to the first regenerator core 110, which cools the received air, by the third high-temperature check valve 140C while the fourth high-temperature check valve 140D blocks air from the second regenerator core from entering the process exhaust port. FIG. 2B shows an example air flow through the first regenerator core 110 and through the second regenerator core 120 in a "reverse flow configuration" during the second time interval.

The high-temperature check valves 140A, 140B, 140C, 140D are opened or closed responsive to air flow without external actuation, as further described below in conjunction with FIGS. 3A and 3B, simplifying high-temperature check valve design.

In many energy conversion devices the incoming process flow and the exhaust process flow have different pressures, so a seal is maintained between the incoming process flow and the exhaust process flow to prevent leakage between the incoming process flow and exhaust process flow. For example, if a portion of the incoming process flow leaks into the exhaust process flow, the efficiency of the energy conversion device is reduced. In one embodiment, sealing within the four-way valve 130 is accomplished by an inflatable seal that disengages prior to actuation and reengages when sealing is required, allowing for rapid opening and closing times using a low-cost actuation system with very low leakage rates and an extended operating lifetime. For example, the four-way valve 130 includes a plurality of butterfly valves and when a butterfly valve is in a closed position a seal associated with the butterfly valve inflates and fills a gap between the butterfly disk and the walls of a duct of the four-way valve 130, effectively eliminating leakage across the butterfly valve. To have rapid opening times, low torque for actuator operation and low wear, the seal is deflated before the butterfly valve opens, providing a small gap between the walls of the duct and an activated butterfly valve. If used in a combustion device, such as a regenerative thermal oxidizer, the inflatable seals included in the four-way valve 130 prevent volatile organic compounds and other contaminants from the incoming process flow from leaking into the exhaust stream and reducing the destruction effectiveness of the device.

Figures 3A, 3B:
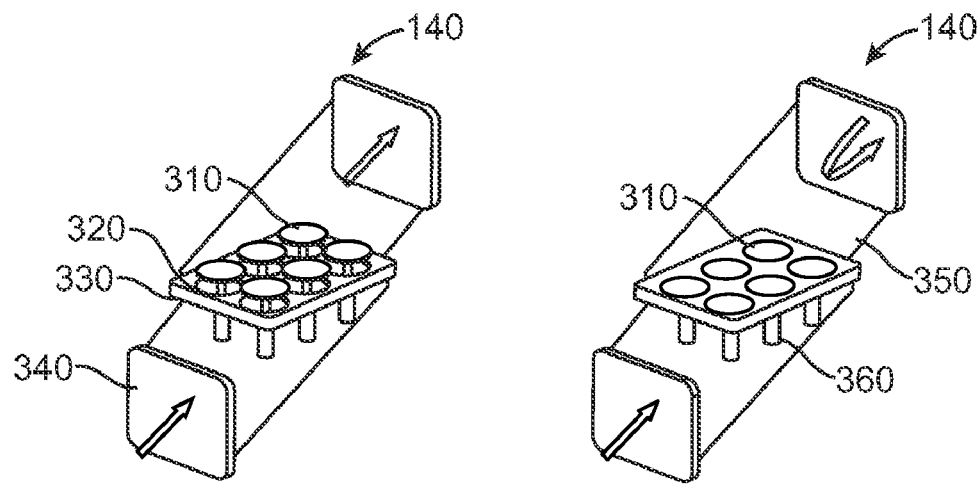
FIG. 3A is an isometric view of a high temperature check valve in an open position in accordance in one embodiment.
FIG. 3B is an isometric view of a high temperature check valve in a closed position in accordance with one embodiment.

FIGS. 3A and 3B are isometric views of a high-temperature check valve 140 in an open position and a closed position, respectively. For purposes of illustration, FIGS. 3A and 3B show the walls of the duct enclosing the high-temperature check valve 140 as translucent.

When in an open configuration as shown in FIG. 3A, air flow enters a high-temperature check valve 140A, 140B, 140C, 140D through an inlet header 340 and lifts one or more valve poppets 310 away from a first surface of a valve seat 320 included in a valve head 330, creating an opening through which air from the flow passes through to the outlet header 350. While a valve poppet 310 is held by a valve stem and a valve guide 360 constrains the directions in which the valve poppet 310 moves, the valve poppet 310 is free to slide toward and away from a first surface of the valve seat 320. For example, the valve poppet 310 moves toward or away from a surface of the valve seat 320 that is parallel to a surface of the valve poppet 310. If the air flow direction attempts to reverse, the air flow pushes one or more valve poppets 310 against the first surface of the valve seat 320, closing off the flow path in the high-temperature check valve 140A, 140B, 140C, 140D as shown in FIG. 3B. For example, if the pressure downstream from the high-temperature check valve 140A, 140B, 140C, 140D is greater than the pressure upstream from the high-temperature check valve 140A, 140B, 140C, 140D, one or more valve poppets 310 are pushed against the first surface of the valve seat 320. In one embodiment, the high-temperature check valve 140 is configured so that gravity returns one or more valve poppets 310 to a closed position. Alternatively, a spring may be used to return one or more valve poppets 310 to the closed position. However, by using gravity, rather than a spring, to return one or more valve poppets 310 to the closed position, the pressure drop across the high-temperature check valve 140A, 140B, 140C, 140D is reduced, increasing the life of the high-temperature check valve 140A, 140B, 140C, 140D.

The one or more valve poppets 310, valve seats 320 and valve guides 360 are constructed from materials capable of prolonged operation at high temperatures. For example, the high-temperature check valve components 140 are constructed from materials used for low heat rejection (LHR) compression ignition engine exhaust valves operating using dry fuels such as natural gas and using non-lubricated components capable of prolonged operation at high temperatures.

Figure 4:
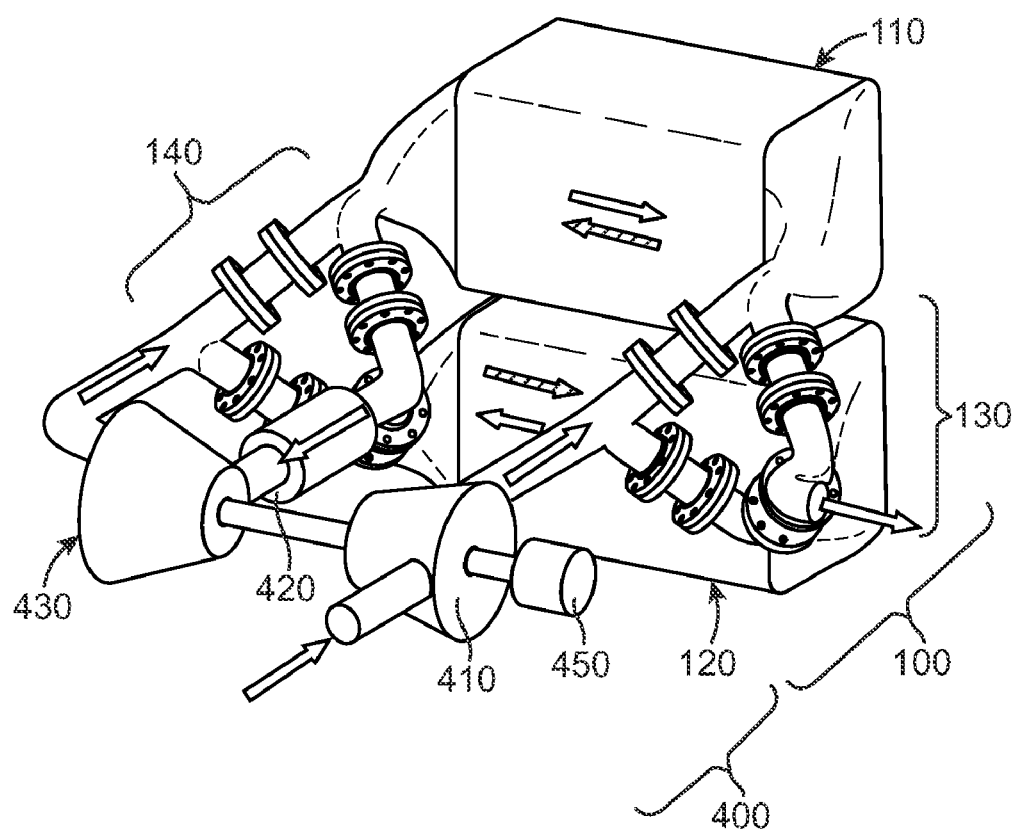
FIG. 4 is an isometric view of a system including a gas turbine system coupled to a regenerative heat exchanger in accordance with one embodiment.

FIG. 4 is an isometric view of one embodiment of a system including a regenerator system 100 coupled to a microturbine system 400. In the embodiment shown by FIG. 4, the four-way valve 130 of the regenerator system 100 receives inlet process air from a compressor 410, such as a gas turbine compressor, included in the microturbine system 400. High-temperature process air from the first regenerator core 110 and the second regenerator core 120 travels through the high-temperature check valve assembly 140 into a combustor 420 of the microturbine system 400 through a process inlet port. From the combustor 420, the air flow enters a turbine 430 which extracts power from the air flow to drive the compressor 410 and a generator 450. As power is extracted from the air flow, the air flow temperature is reduced. The exhaust flow from the turbine 430, which remains at a high temperature, enters the regenerator system 100 as high temperature process air through a process exhaust port coupled to the high-temperature check valve assembly 140 and travels through the second regenerator core 120 which extracts heat from the exhaust flow from the turbine 430. The regenerator system 100 transfers the extracted heat to the incoming process flow.

Figure 5A:
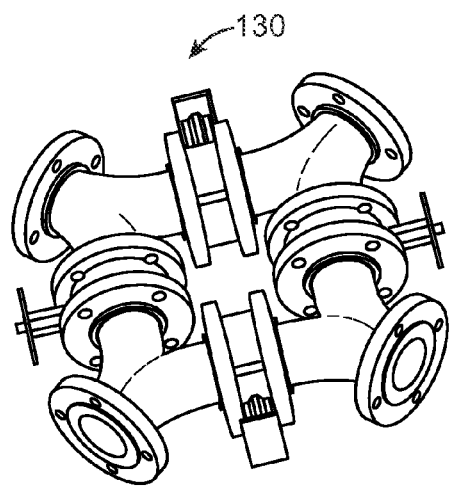
FIG. 5A is an isometric view of a planar configuration of a four-way valve in accordance with one embodiment.
Figure 5B:
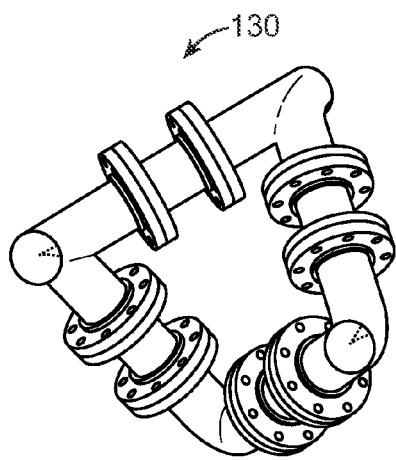
FIG. 5B is an isometric view of an axial configuration of a four-way valve in accordance with one embodiment.

FIG. 5A is an isometric view of an embodiment of a planar configuration of a four-way valve 130 where the inlet ports to the four-way valve 130 and the outlet ports from the four-way valve are in a single plane. FIG. 5B is an isometric view of one embodiment of an axial configuration of a four-way valve 130 where inlet ports to the four-way valve 130 and outlet ports from the four-way valve 140 have the same axial direction.

Figure 6:
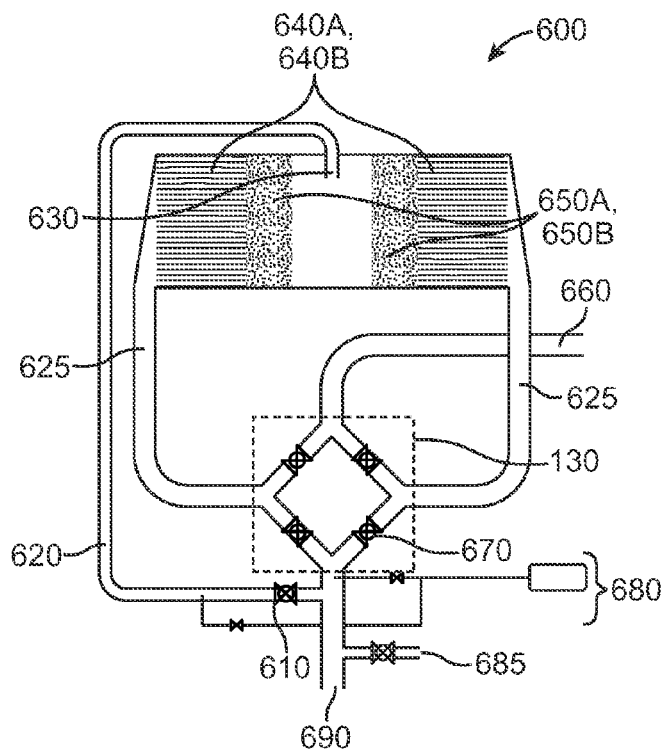
FIG. 6 is a schematic representation of a regenerative thermal oxidizer including a four-way valve assembly in accordance with one embodiment.

FIG. 6 is a schematic representation of one embodiment of a regenerative thermal oxidizer (RTO) 600 including a four-way valve 130 which periodically alternates the direction of flow through the first regenerator 640A and through the second regenerator 640B. In the embodiment shown in FIG. 6, the four-way valve 130 includes four butterfly valves 670 which direct air flow from an inlet port 690 through the first regenerator core 640A and/or the second regenerator core 640B. The butterfly valves 670 in the four-way valve 130 also direct air flow from the first regenerator core 640A or from the second regenerator core 640B to an exhaust port 660. In one embodiment, the RTO 600 includes a bypass port 685 which allows uncontaminated air to enter the RTO 600 and prevents contaminants from bypassing the RTO when the flow is reversed. In one embodiment, the RTO 600 breaks down volatile organic compounds produced in various chemical, industrial or agricultural processes. For example, the four-way valve 130 configuration shown in FIG. 6 is used in a small-scale RTO having a range of 5,000 to 10,000 standard cubic feet per minute (SCFM).

To enable rapid heating, the RTO 600 includes a preheat bypass valve 610 upstream from the four-way valve 130. A portion of incoming process air flow is directed through the preheat bypass valve 610 to a preheat bypass duct 620. Fuel is added to air from the preheat bypass duct 620 and the mixture of fuel and air from the preheat bypass duct 620 is burned in a preheat manifold 630 adjacent to the first regenerator core 640A and the second regenerator core 640B. In one embodiment, the preheat manifold 630 allows the RTO 600 to reach operating temperature in less than thirty minutes.

Alternatively, fuel from a fuel supply 670 is added to the incoming process air flow and an ignition system ignites the fuel/air mixture within a first porous media combustor 650A adjacent to the first regenerator core 640A and/or a second porous media combustor 650B adjacent to the second regenerator core 640B. The flow passages within the first regenerator core 650A and the second regenerator core 650B to prevent flames from the ignited fuel/air mixture propagating back from a combustor.

Figure 7B:
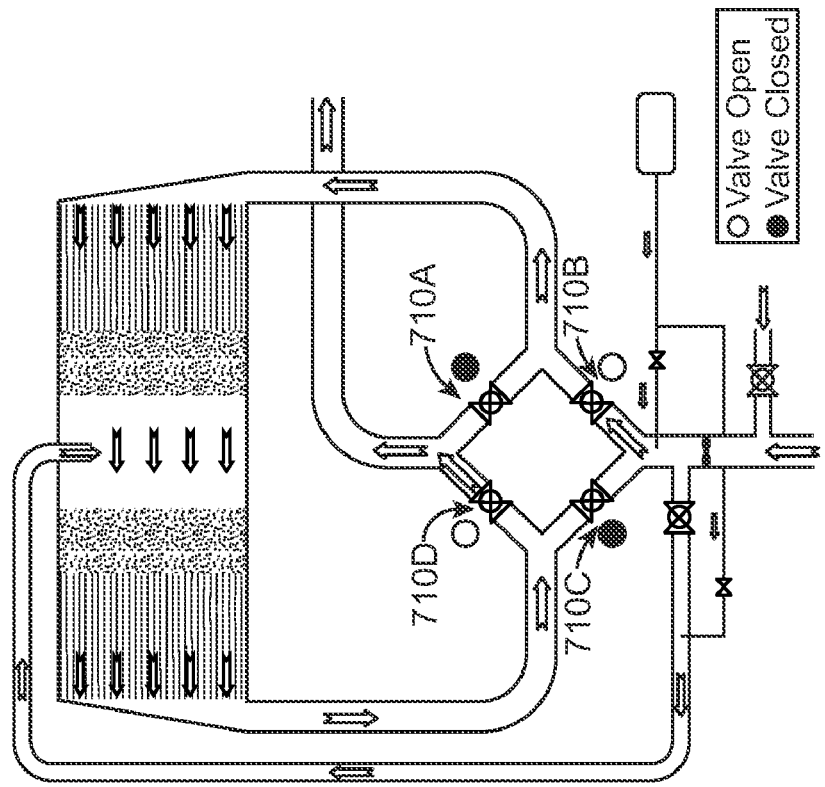
FIG. 7B is a schematic representation of a regenerative thermal oxidizer including a four-way valve assembly showing the flow path in a reverse flow mode in accordance with one embodiment.
Figure 7A:
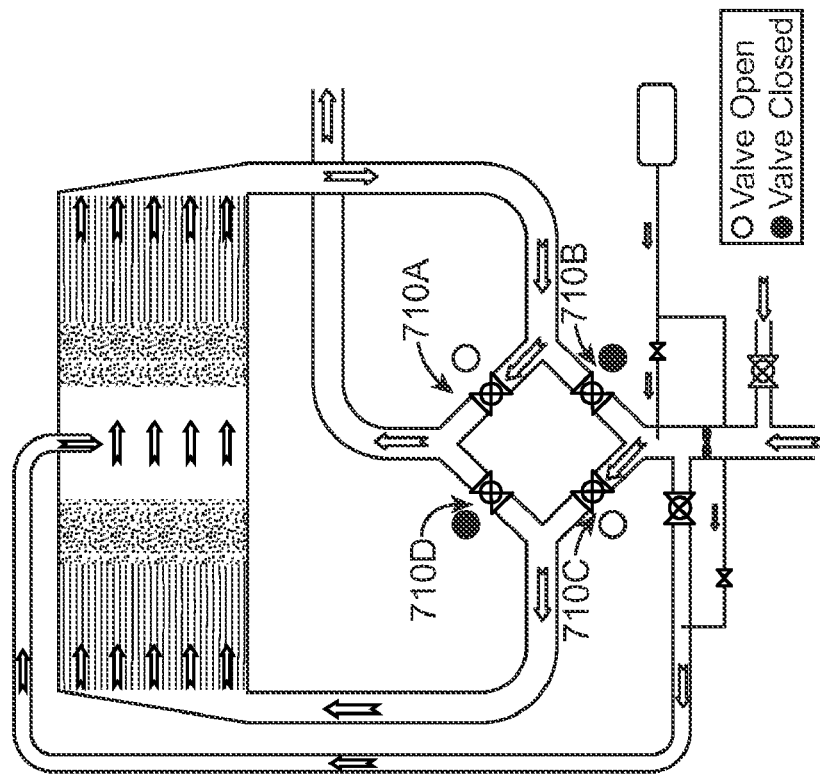
FIG. 7A is a schematic representation of a regenerative thermal oxidizer including a four-way valve assembly showing the flow path in a forward flow mode in accordance with one embodiment.

FIG. 7A is a schematic representation of one embodiment of the air flow path through a RTO 600 including a four-way valve 130 in a forward flow mode. FIG. 7A and FIG. 7B, further described below, include symbols indicating the positions of butterfly valves 710A, 710B, 710C, 710D within the four-way valve 130. In FIGS. 7A and 7B, a white circle proximate to a butterfly valve 710A, 710B, 710C, 710D indicates an open butterfly valve 710A, 710B, 710C, 710D while a black circle proximate to a butterfly valve 710A, 710B, 710C, 710D indicates a closed butterfly valve 710A, 710B, 710C, 710D. In the forward flow mode shown by FIG. 7A, the four-way valve 130 directs air from the inlet port through a first open butterfly valve 710C and into the first regenerator core 640A and the second regenerator core 640B. Air from the second regenerator core 640B is directed through a second open butterfly valve 710A to an exhaust port 660. By closing butterfly valves 710B, 710D, the RTO 600 prevents air from the second regenerator core 640B from being recirculated through the first regenerator core 640A and prevents input air from the inlet port 690 from circulating through the second regenerator core 640B or from entering the exhaust port 660 via the four-way valve 130. In one embodiment, butterfly valves 710B, 710D block air flow by each deforming a seal so that the seal contacts a butterfly valve gate included in the butterfly valve 710B, 710D.

In the reverse flow mode depicted by FIG. 7B, butterfly valves 710B, 710D are open while butterfly valves 710A, 710C are closed. By opening butterfly valve 710B and closing butterfly valve 710C, the four-way valve 130 directs air from the inlet port 690 into the second regenerator core 640B while blocking air from the inlet port 690 from entering the exhaust port 660. Similarly, opening butterfly valve 710D directs air from the first regenerator core 640A to the exhaust port 660 while closing butterfly valve 710A blocks air from the first regenerator core 640A from entering the second regenerator core 640B via the four-way valve 130. In one embodiment, butterfly valves 710A, 710D block air flow by each deforming a seal so that the seal contacts a butterfly valve gate included in the butterfly valve 710A, 710D.

In the embodiments shown by FIGS. 7A and 7B, the preheat bypass valve 610 of the RTO 600 is closed and the destruction efficiency of the RTO 600 is increased by introducing an external bypass flow through the bypass port 685 while the four-way valve 130 is actuated. The external bypass flow allows uncontaminated air to enter the RTO 600 while preventing contaminants from bypassing the RTO when the flow is reversed.

Figure 8:
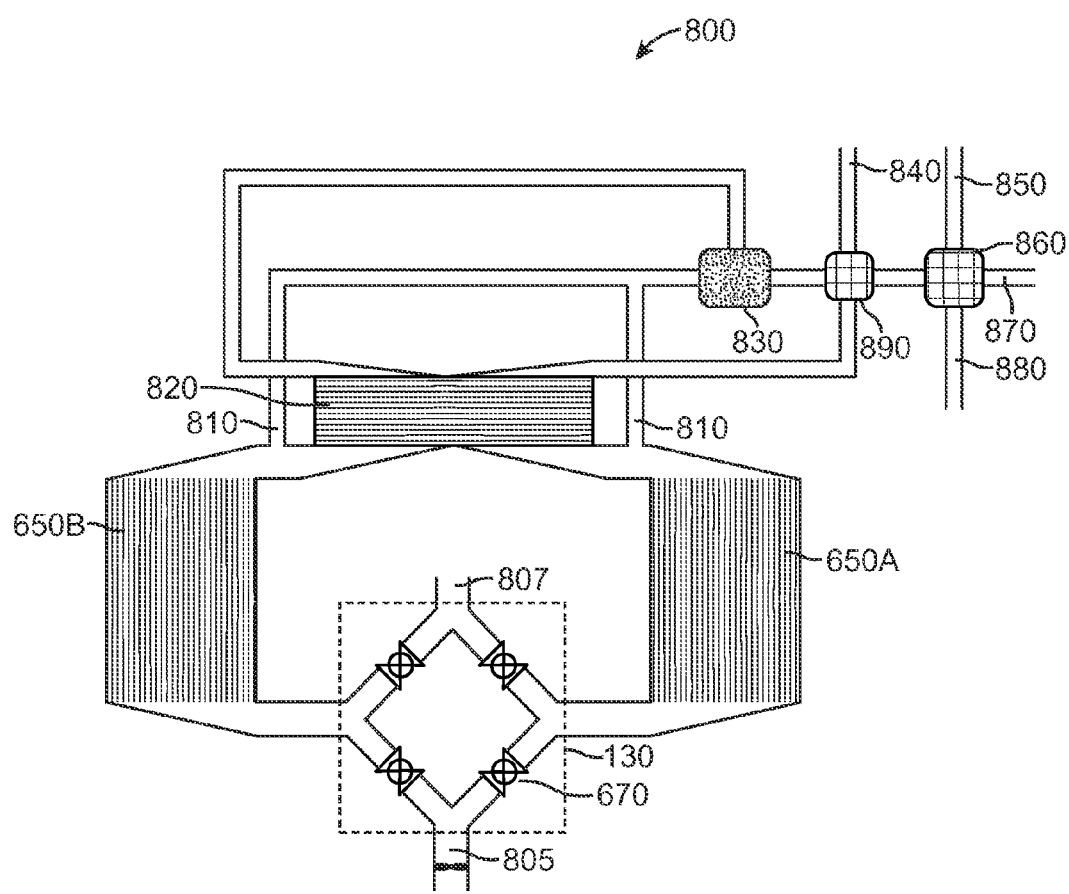
FIG. 8 is a schematic representation of a periodic flow fuel cell in accordance with one embodiment.
Figure 9A:
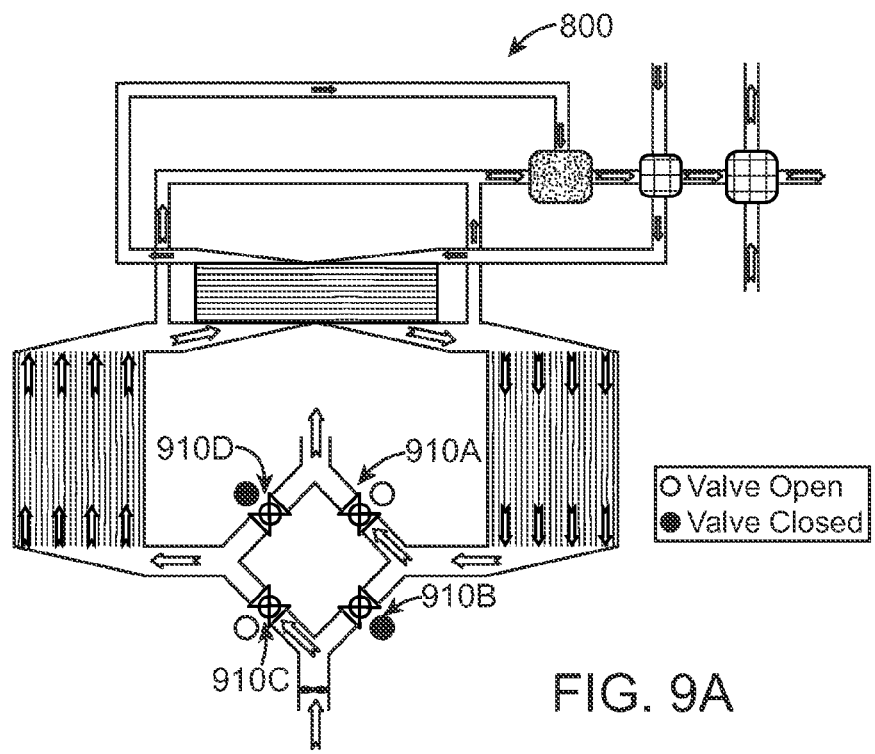
FIG. 9A is a schematic representation of a periodic flow fuel cell showing the flow path in a forward flow mode in accordance with one embodiment.
Figure 9B:
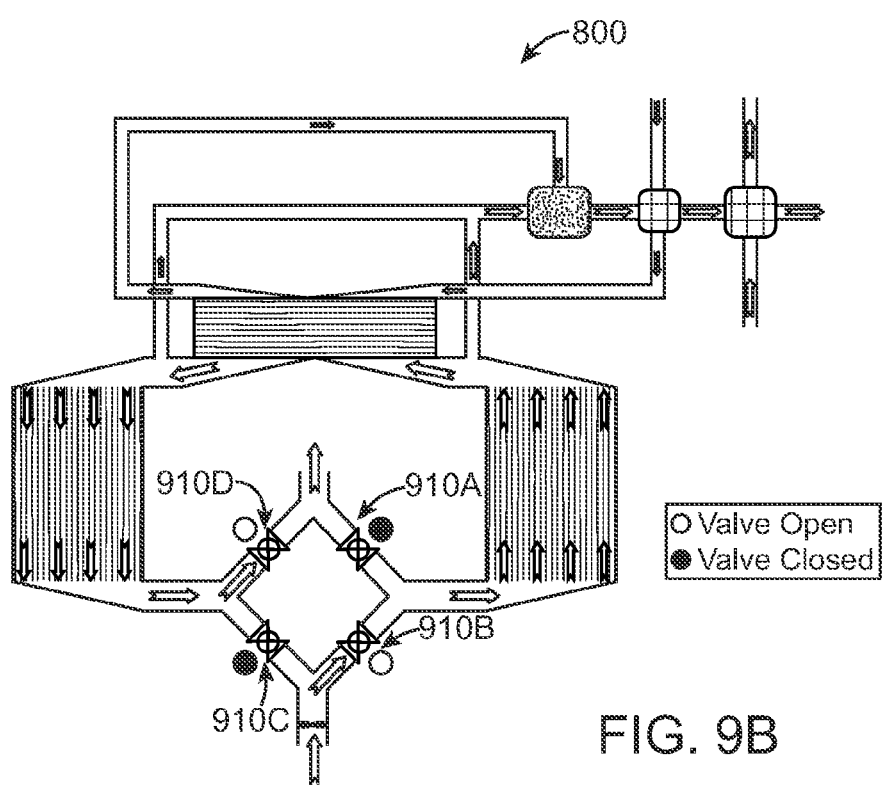
FIG. 9B is a schematic representation of a periodic flow fuel cell showing the flow path in a reverse flow mode in accordance with one embodiment.

FIG. 8 is a schematic representation of one embodiment of a periodic flow fuel cell 800. The periodic flow fuel cell 800 includes a four-way valve 130 including a plurality of butterfly valves 670 for directing air flow from an inlet 805 and/or from a first regenerator core 645A, 650B. FIGS. 9A and 9B further illustrate operation of the periodic flow fuel cell 800 in a forward flow mode and in a reverse flow mode, respectively. In the forward flow mode shown by FIG. 9A, air is received via the inlet 805 and routed by the four-way valve 130 into the first regenerator core 650. In FIG. 9A, butterfly valve 910C is open while butterfly valve 910B is closed to direct air from the inlet 805 into the first regenerator core 650A. Air routed to the first regenerator core 650A absorbs heat from the first regenerator core 650A and the heated air enters a fuel cell stack 820. Oxygen included in the incoming air diffuses across a membrane where it reacts with hydrogen. The air then exits the fuel cell stack 820 and enters the second regenerator core 650B, which absorbs heat from the air. By absorbing heat from the air exiting the fuel cell stack 820, the second regenerator core 650B recharges itself. After the second regenerator core 640B absorbs heat, air exits the second regenerator core 650B into the four-way valve 130. In the four-way valve 130, butterfly valve 910A is open while butterfly valves 910B, 910D are closed, so that air exiting the second regenerator core 650B is directed to an exhaust 807. In one embodiment, butterfly valves 910B, 910D block air flow by each deforming a seal so that the seal contacts a butterfly valve gate included in the butterfly valve 910B, 910D.

Periodically, the four-way valve 130 reverses the direction of air flow by opening butterfly valves 910B, 910D and closing butterfly valves 901A, 910C. In one embodiment, butterfly valves 710A, 710C block air flow by each deforming a seal so that the seal contacts a butterfly valve gate included in the butterfly valve 710A, 710C. This directs air from the inlet 805 into the second regenerator core 640B, where the air absorbs heat. The heated air travels from the second regenerator core 640B into the fuel cell stack 820. Air from the fuel cell stack 820 travels through the first regenerator core 640A, which recharges itself by absorbing heat from the air from the fuel cell stack 820. Air then exists the first regenerator core 640A into the four-way valve 130, which directs air to the exhaust 807 through open butterfly valve 910D while preventing the air from re-entering the second regenerator core 640B by closing butterfly valve 910A.

While air flow in the periodic flow fuel cell 800 periodically alternates in direction, fuel flows in a single direction. Fuel is received from a fuel supply 840 and preheated by a fuel preheat heat exchanger 890. The heated fuel then enters the fuel cell stack 820. Unused fuel is directed from the fuel cell stack 820 to a combustor 830 and portion of air flowing between the first regenerator core 640A and the second regenerator core 640B is directed to the combustor 830 through one or more combustor air take-off ducts 810. High temperature gas from the combustor 830 is used by the fuel preheat heat exchanger 890 to preheat fuel from the fuel supply 840. The high temperature gas from the combustor 830 then enters a heat recovery heat exchanger 860.

In various embodiments, the four-way valve 130 shown in FIGS. 6-9B may be implemented using an integrated four-way valve, such as the integrated four-way valve further described below in conjunction with FIGS. 10-15B.

Figure 10:
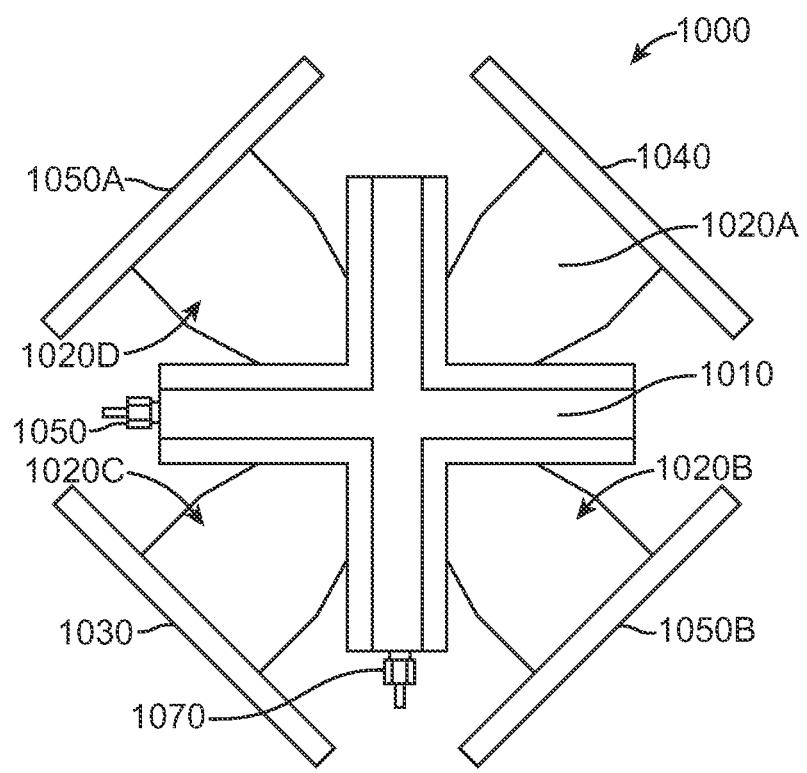
FIG. 10 is a schematic representation of an integrated four-way valve in accordance with one embodiment.

FIG. 10 is a schematic representation of one embodiment of an integrated four-way valve 1000. In the embodiment shown by FIG. 10, the integrated four-way valve 1000 comprises a valve body 1010 and four flanged pipes 1020A, 1020B, 1020C, 1020D coupled to the valve body 1010. A first reversible flow port 1050A is coupled to a first flanged pipe 1020D and a second reversible flow port 1050B is coupled to a second flanged pipe 1050B. An inlet port 1030 is coupled to a third flanged pipe 1020C while an exhaust port 1040 is coupled to a fourth flanged pipe 1020A. A forward flow seal pressurization port 1070 and a reverse flow seal pressurization port 1050 are coupled to the valve body 1010 and provide pressurized air to actuate seals included in the integrated four-way valve 1000, as further described below in conjunction with FIG. 11.

Figure 11:
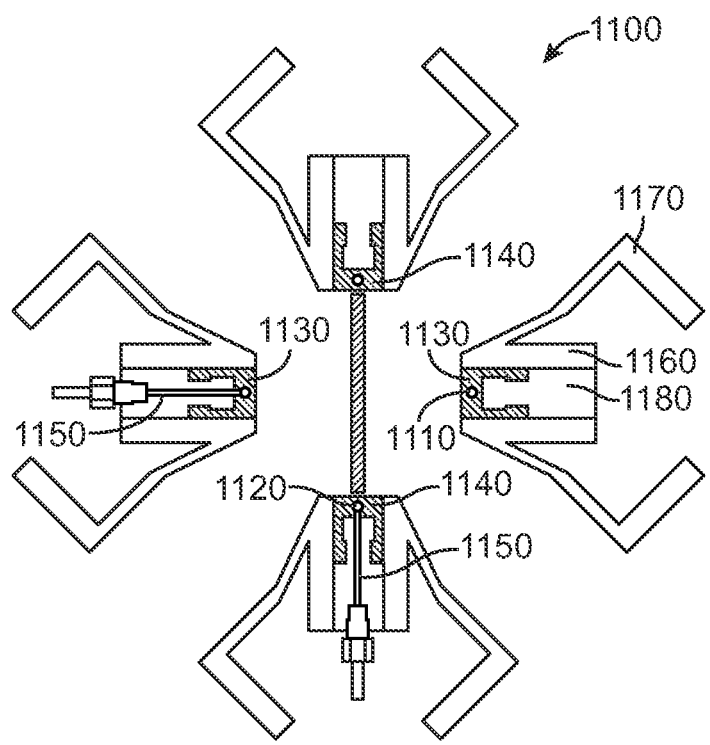
FIG. 11 is a planar cross-sectional view of an integrated four-way valve in accordance with one embodiment.
Figure 12A:
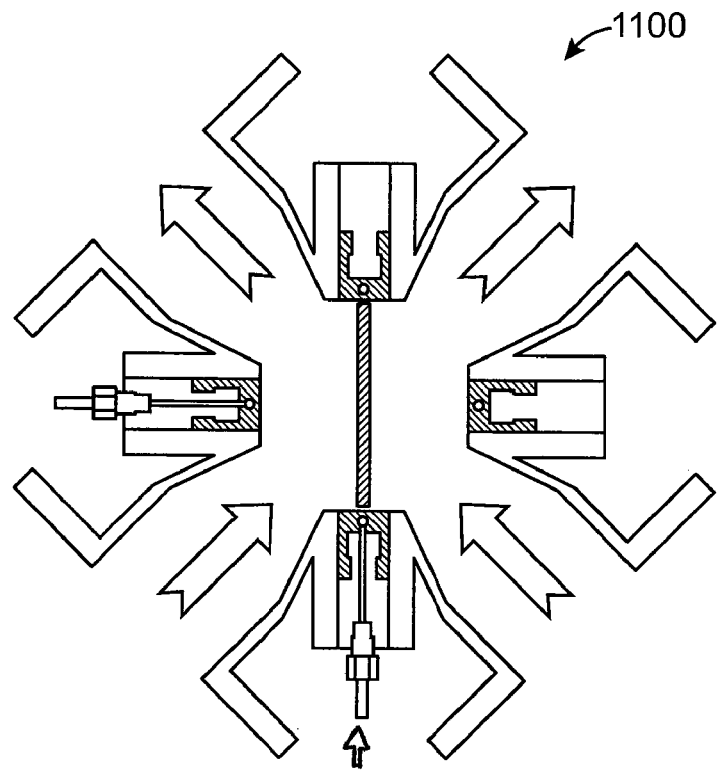
FIG. 12A is a planar cross-sectional view of an integrated four-way valve showing flow direction in a forward flow mode in accordance with one embodiment.
Figure 12B:
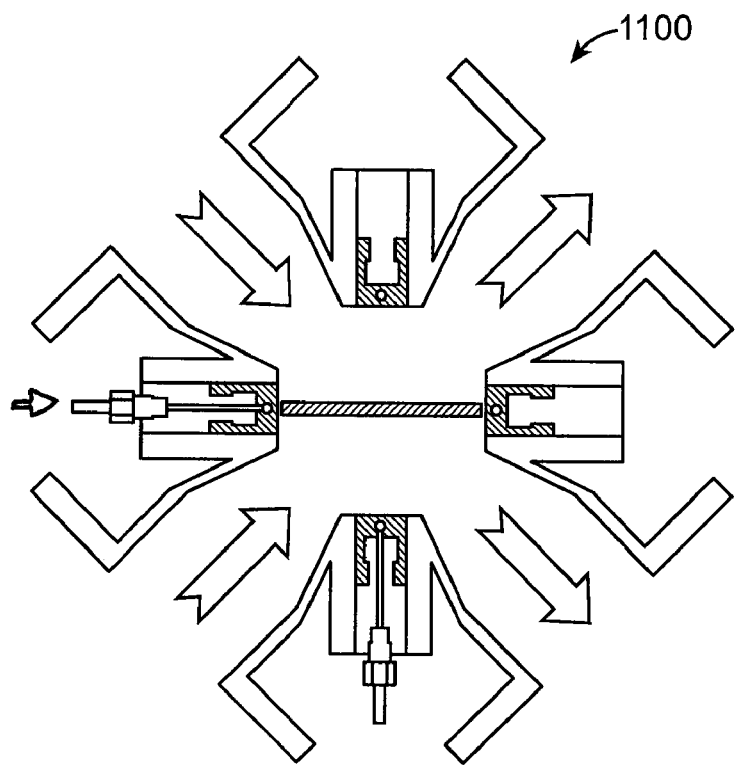
FIG. 12B is a planar-cross sectional view of an integrated four-way valve showing flow direction in a reverse flow mode in accordance with one embodiment.

FIG. 11 shows a planar cross-sectional view of one embodiment of an integrated four-way valve 1100. FIGS. 12A and 12B show the flow direction through the integrated four-way valve 1100 in a forward mode and in a reverse mode, respectively. One or more forward flow seals 1140 receive pressurized air from the forward flow seal pressurization port 1070 through a forward seal pressurization line 1150 while one or more reverse flow seals 1130 receive pressurized air form the reverse flow seal pressurization port 1050 through. In one embodiment the forward flow seals 1140 and the reverse flow seals 1130 each comprise an elastomer. The forward flow seals 1140 include one or more forward seal bladders 1120 that, when pressurized, deform a forward flow seal 1140 so it contacts a butterfly valve gate. Similarly, the reverse flow seals 1130 include one or more reverse bladders 1110 that, which pressurized, deform a reverse flow seal 1130 so it contacts a butterfly valve gate.

FIG. 12A shows air flow through an integrated four-way valve in a forward flow mode while FIG. 12B shows air flow through an integrated four-way valve in a reverse flow mode.

Figure 13:
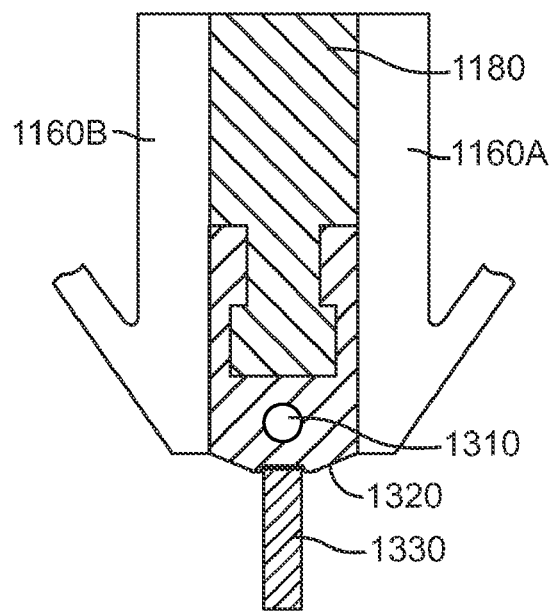
FIG. 13 is a cross section through a four-way valve showing an actuated seal in contact with a butterfly disk in accordance with one embodiment.

FIG. 13 shows a cross sectional view of one embodiment of a four-way valve 130 where a seal 1320 is actuated. When the seal 1320 is actuated, a seal bladder 1310 included in the seal 1320 is filled with pressurized air, causing the seal 1320 to deform and contact the butterfly disk 1330. For illustration, FIG. 13 shows the location of the seal 1310 relative to the valve body 1180 and internal flanges 1160 of the four-way valve 130.

Figure 14:
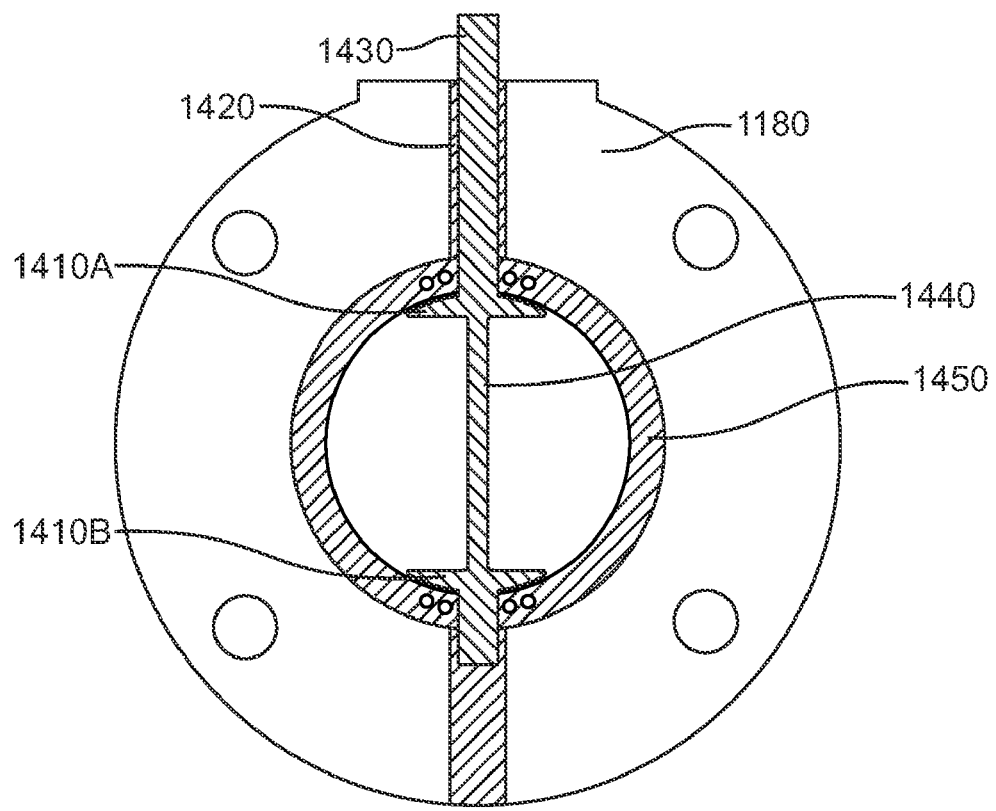
FIG. 14 is a vertical cross-sectional view of a four-way valve where a butterfly disk is shown perpendicular to the cross section in accordance with one embodiment.

FIG. 14 depicts a vertical cross-section view of one embodiment of an integrated four-way valve 130. In FIG. 14, a butterfly gate disk 1440 is perpendicular to the plane of the cross-section shown. In one embodiment, two concentric bladders circle a valve stem 1430 along a first butterfly end cap 1410A and a second butterfly end cap 1410B. Additionally, FIG. 14 shows a valve bushing 1420 separating a valve stem 1420 from the valve body 1180.

Figure 15A:
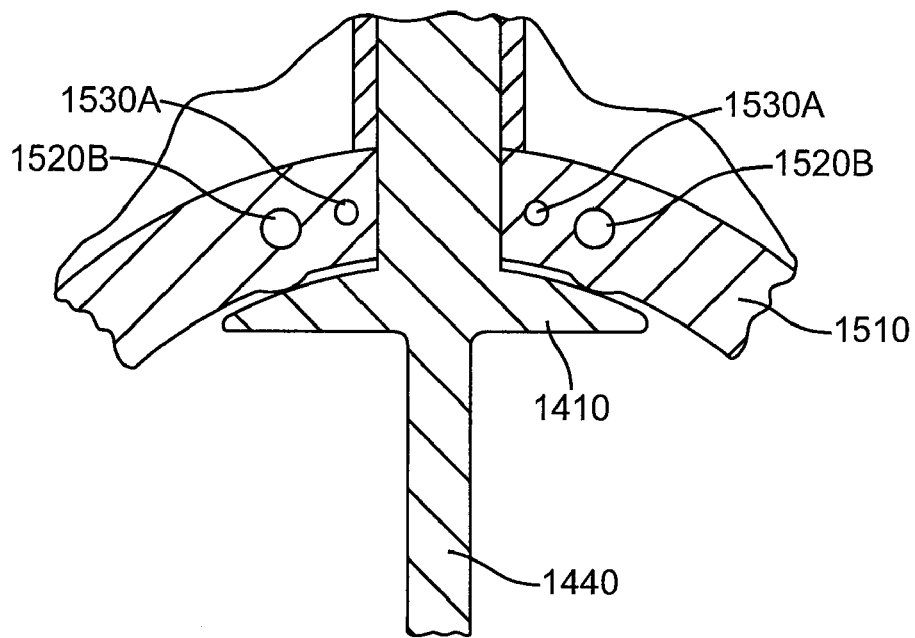
FIG. 15A is a sectional view of a butterfly end cap seal when a forward flow seal is actuated in accordance with one embodiment.

FIG. 15A is a sectional view of one embodiment of a butterfly end cap seal 1510 actuated to allow air flow in a forward mode. To permit forward air flow, one or more reverse flow end cap bladders 1530A, 1530B are not pressurized while one or more forward flow end cap bladders 1520A, 1520B are pressurized. By pressurizing the forward flow end cap bladders 1520A, 1520B, the butterfly end cap seal 1510 physically contacts the butterfly end cap 1410 coupled to the butterfly disk 1440 in a first set of locations.

Figure 15B:
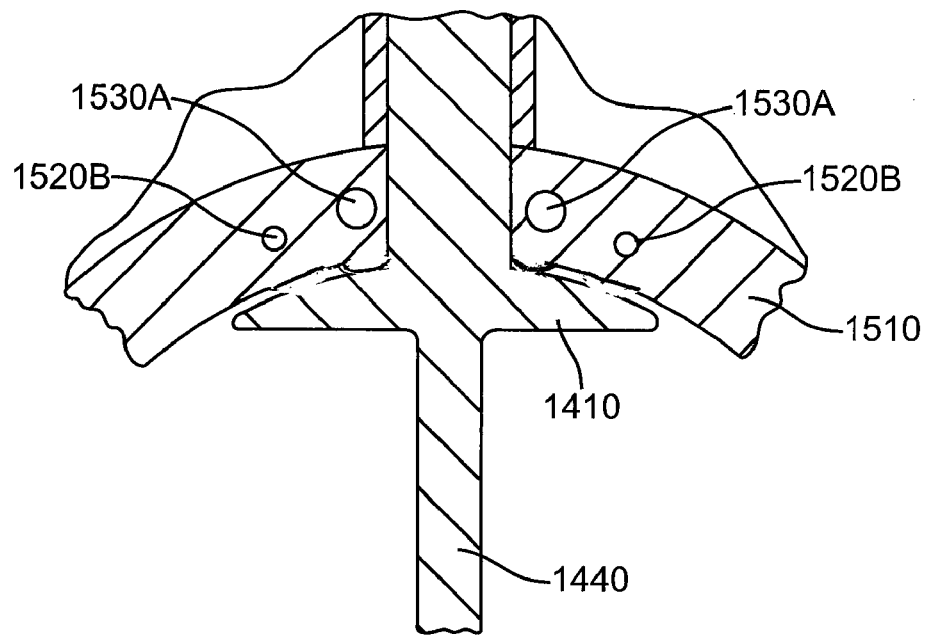
FIG. 15B is a sectional view of a butterfly end cap seal when a reverse flow seal is actuated in accordance with one embodiment.

FIG. 15B is a sectional view of one embodiment of a butterfly end cap seal 1510 actuated to allow air flow in a reverse mode. To reverse air flow, one or more reverse flow end cap bladders 1530A, 1530B are pressurized while one or more forward flow end cap bladders 1520A, 1520B are not pressurized. By pressurizing the reverse flow end cap bladders 1530A, 1530B, the butterfly end cap seal 1510 physically contacts the butterfly end cap 1410 coupled to the butterfly disk 1440 in a second set of locations.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A heat exchanger comprising:
a first regenerator core including a first cold section and a first hot section;
a second regenerator core including a second cold section and a second hot section;
a four-way valve coupled to the first cold section and to the second cold section, the four-way valve including an input port and an exhaust port, the four-way valve configured to direct air from the input port to the first regenerator core and to direct air received from the second regenerator core to the exhaust port during a first time interval, the four-way valve also configured to direct air from the input port to the second regenerator core and to direct air received from the first regenerator core to the exhaust port during a second time interval;
a first high-temperature check valve coupled to the first hot section, the first high-temperature check valve configured to receive heated air from the first regenerator core during the first time interval and to direct the heated air to a process inlet port during the first time interval;
a second high-temperature check valve coupled to the process inlet port and to the second hot section, the second high-temperature check valve configured to block air from the process inlet port from entering the second regenerator core during the first time interval;
a third high-temperature check valve coupled to a process exhaust port and to the first hot section, the third high-temperature check valve configured to block air from the first regenerator core from entering the process exhaust port during the first time interval; and
a fourth high-temperature check valve coupled to the process exhaust port and to the second hot section, the fourth high-temperature check valve configured to receive heated air from the process exhaust port during the first time interval and to direct the heated air from the process exhaust port to the second regenerator core during the first time interval.

2. The heat exchanger of claim 1, wherein:
during the first time interval, the first regenerator core is configured to transmit heat to increase a temperature of air from the four-way valve and the second regenerator core is configured to absorb heat from the heated air from the process exhaust port received from the fourth high-temperature check valve.

3. The heat exchanger of claim 1, wherein:
during the second time interval, the first high-temperature check valve configured to block air from the process inlet port from entering the first regenerator core;
during the second time interval, the second high-temperature check valve configured to receive heated air from the second regenerator core and to direct the heated air from the second regenerator core to the process inlet port;
during the second time interval, the third high-temperature check valve configured to receive heated air from the process exhaust port and to direct the heated air from the process exhaust port to the first regenerator core; and
during the second time interval, the fourth high-temperature check valve configured to block air from the second regenerator core from entering the process exhaust port.

4. The heat exchanger of claim 3, wherein:
during the second time interval, the second regenerator core is configured to transmit heat to increase a temperature of air from the four-way valve and the first regenerator core is configured to absorb heat from the heated air received from the third high-temperature check valve.

5. The heat exchanger of claim 1, wherein:
heated air entering the first high-temperature check valve from the first regenerator core during the first time interval moves a valve poppet included in the first high-temperature check valve away from a first surface of a valve seat creating an opening enabling air flow through the first high-temperature check valve during the first time period.

6. The heat exchanger of claim 5, wherein:
air entering the first high-temperature check valve from the process inlet port during the second time interval pushes the valve poppet to contact the first surface of the valve seat, blocking air flow through the first high-temperature check valve during the second time period.

7. The heat exchanger of claim 1, wherein the first regenerator core includes a first ceramic matrix and the second regenerator core includes a second ceramic matrix.

8. The heat exchanger of claim 1 wherein the process inlet port is coupled to a combustor of a gas turbine engine and the process exhaust port is coupled to an outlet of the gas turbine engine.

9. The heat exchanger of claim 1, wherein the process inlet port is coupled to fuel cell stack air inlet and the process exhaust port are coupled to a fuel cell stack air outlet.

* * * * *